United States Patent
Shibata et al.

(10) Patent No.: US 8,360,625 B2
(45) Date of Patent: Jan. 29, 2013

(54) VEHICLE HEADLAMP

(75) Inventors: Hiroki Shibata, Shizuoka (JP);
Kazutami Oishi, Shizuoka (JP);
Masahiro Kusagaya, Shizuoka (JP);
Tatsuhiro Terada, Shizuoka (JP); Kouji Magoori, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 12/880,512

(22) Filed: Sep. 13, 2010

(65) Prior Publication Data
US 2011/0063866 A1 Mar. 17, 2011

(30) Foreign Application Priority Data
Sep. 14, 2009 (JP) ................... 2009-212333

(51) Int. Cl.
*F21V 21/14* (2006.01)
(52) U.S. Cl. ........ 362/523; 524/530; 524/531; 524/475; 524/538; 524/507
(58) Field of Classification Search ............. 362/523, 362/524, 530, 475, 476, 531, 532, 538, 507
See application file for complete search history.

(56) References Cited

U.S. PATENT DOCUMENTS

| | | | | |
|---|---|---|---|---|
| 5,526,238 A * | 6/1996 | Van Oel et al. | ........ | 362/528 |
| 5,971,574 A * | 10/1999 | Taniuchi et al. | ........ | 362/508 |
| 6,017,136 A | 1/2000 | Burton | | |
| 6,607,295 B2 * | 8/2003 | Hayakawa | ........ | 362/517 |
| 7,315,127 B2 * | 1/2008 | Tajima | ........ | 315/82 |
| 8,007,153 B2 * | 8/2011 | Tatsumi et al. | ........ | 362/539 |
| 2002/0085385 A1 | 7/2002 | Shirai | | |
| 2004/0057243 A1 * | 3/2004 | Takii et al. | ........ | 362/512 |
| 2008/0106909 A1 * | 5/2008 | Kusagaya | ........ | 362/524 |

FOREIGN PATENT DOCUMENTS

JP 2004-227933 A 8/2004

OTHER PUBLICATIONS

Extended European Search Report dated Sep. 17, 2012 issued by the European Patent Office in counterpart European Application No. 10175860.5.

* cited by examiner

*Primary Examiner* — Jong-Suk (James) Lee
*Assistant Examiner* — Mark Tsidulko
(74) *Attorney, Agent, or Firm* — Sughrue Mion, PLLC

(57) ABSTRACT

A vehicle headlamp is provided with: a frame; a lamp unit, which includes a first and a second connection sections and, which is rotatable with respect to the frame; a slider connected to first connection section and which is supported on the frame so as to be movable in a front-rear direction; a rotor connected to the second connection section and which is supported on the frame so as to be turnable in a horizontal direction; a drive operation section for moving the slider in the front-rear direction; and a rotation operation section for turning the rotor in the horizontal direction. The first connection section and the second connection section are positioned so as to be separated from each other substantially in the up-down direction.

9 Claims, 11 Drawing Sheets

VEHICLE HEADLAMP

BACKGROUND OF THE INVENTION

1. Field of the Invention

The present invention relates to a vehicle headlamp in which a vibration resistance is improved by connecting a lamp unit to another member using two connection sections.

2. Related Art

There is a vehicle headlamp in which a lamp unit having a light source is disposed inside a lamp casing formed of a cover and a lamp housing.

As shown in JP-A-2004-227933, the lamp unit of the vehicle headlamp can be subjected to an initial position adjustment (aiming adjustment) of an irradiation direction thereof using an optical axis adjustment mechanism (aiming adjustment mechanism). In this kind of vehicle headlamp, it is possible to carry out a so-called right-left aiming adjustment in which the lamp unit is turned in a right-left direction (horizontal direction) with respect to the lamp casing and a so-called up-down aiming adjustment in which the lamp unit is tilted in an up-down direction with respect to the lamp casing.

In the vehicle headlamp described in JP-A-2004-227933, the lamp unit is supported on a frame passing through in a front-rear direction, and the frame is supported on the lamp housing via two adjustment shafts having screw sections and one fulcrum shaft. Rear end sections of the fulcrum shaft and the two adjustment shafts are connected to the lamp housing, a front end section of the fulcrum shaft is connected to a lower end section of the frame, and front end sections of the two adjustment shafts are connected to an upper end section of the frame while being separated from each other in the right-left direction.

In the vehicle headlamp, when the screw sections are screwed into or out of the frame by rotating the adjustment shafts, the frame and the lamp unit are integrally turned in the horizontal direction or tilted substantially in the up-down direction around the fulcrum shaft, whereby the right-left aiming adjustment or the up-down aiming adjustment is carried out.

In the vehicle headlamp of JP-A-2004-227933, the lamp unit is required to be moved (turned) along a circular arc locus with respect to the lamp housing during the aiming adjustment. In contrast, the locus of the operating point of the lamp unit, i.e., the connection point between the adjustment shaft and the frame, becomes linear. Hence, during the aiming adjustment, a load is generated in the lamp unit in a direction orthogonal to the locus of the operating point. Therefore, it is necessary to make design allowance (play) for absorbing this load.

However, in the case that the lamp unit is structured so as to have the above-mentioned allowance, the lamp unit becomes easy to move by the amount of the allowance, for example, due to vibration occurring during the traveling of a vehicle. As a result, displacement and vibration are apt to easily occur in the lamp unit.

In addition, in the vehicle headlamp of JP-A-2004-227933, since the lamp unit is turnably supported on the lamp housing via three connection points, i.e., the fulcrum shaft connected to the frame and the two adjustment shafts, the three connection points are located at positions away from the gravity center of the lamp unit. Eventually, the positions subjected to vibration become away from the gravity center of the lamp unit.

Furthermore, in the vehicle headlamp of JP-A-2004-227933, the frame for supporting the lamp unit is structured so as to be supported on the lamp housing via the fulcrum shaft and the two adjustment shafts. Hence, since the total load of the lamp unit and the frame is applied to the fulcrum shaft and the two adjustment shafts, vibration resistance at the adjustment shafts, etc. is reduced.

SUMMARY OF THE INVENTION

One or more embodiments of the invention provide a vehicle headlamp in which a vibration resistance is improved.

In accordance with one or more embodiments of the invention, a vehicle headlamp is provided with: a frame secured to a lamp housing; a lamp unit, which includes a first connection section and a second connection section and which is rotatable with respect to the frame; a slider, connected to the first connection section and which is supported on the frame so as to be movable in a front-rear direction, wherein the lamp unit is configured to tilt substantially in an up-down direction around the second connection section in response to a movement of the slider in the front-rear direction; a rotor connected to the second connection section and which is supported on the frame so as to be turnable in a horizontal direction, wherein the lamp unit is configured to turn in the horizontal direction around an axis connecting the first connection section and the second connection section in response to a turning movement of the rotor in the horizontal direction; a drive operation section rotatable with respect to the lamp housing, wherein the slider is configured to move in the front-rear direction in response to a rotating movement of the drive operation section; and a rotation operation section rotatable with respect to the lamp housing. The rotor is configured to turn in the horizontal direction in response to a rotating movement of the rotation operation section. The first connection section and the second connection section are positioned so as to be separated from each other substantially in the up-down direction.

In the vehicle headlamp, a gravity center of the lamp unit may be positioned in a vicinity of the axis connecting the first connection section and the second connection section.

The vehicle headlamp may further be provided with: a load holding section provided in the lamp housing and configured to hold the load of the frame and the lamp unit.

The vehicle headlamp may further be provided with: a pressing member movable in the front-rear direction in response to a displacement of the first connection section in a state in which the first connection section is pressed toward the second connection section when the lamp unit is tilted substantially in the up-down direction around the second connection section.

The vehicle headlamp may further be provided with: a holding member secured to the slider and including a supporting slope face inclined in a predetermined direction with respect to a horizontal plane; a sliding slope face formed on the pressing member and configured to be in sliding contact with the supporting slope face when the pressing member moves in the front-rear direction; and a biasing member configured to bias the pressing member in a direction in which the sliding slope face is pressed against the supporting slope face.

Other aspects and advantages of the invention will be apparent from the following description and the appended claims.

DETAILED DESCRIPTION OF THE EXEMPLARY EMBODIMENTS

Exemplary embodiments of the invention will be described below referring to the accompanying drawings.

First Exemplary Embodiment

A vehicle headlamp 1 according to a first exemplary embodiment will be described below (see FIGS. 1 to 5).

The vehicle headlamp 1 is installed so as to be disposed at each of left and right end sections of a front end section of a vehicle.

Figure 1:
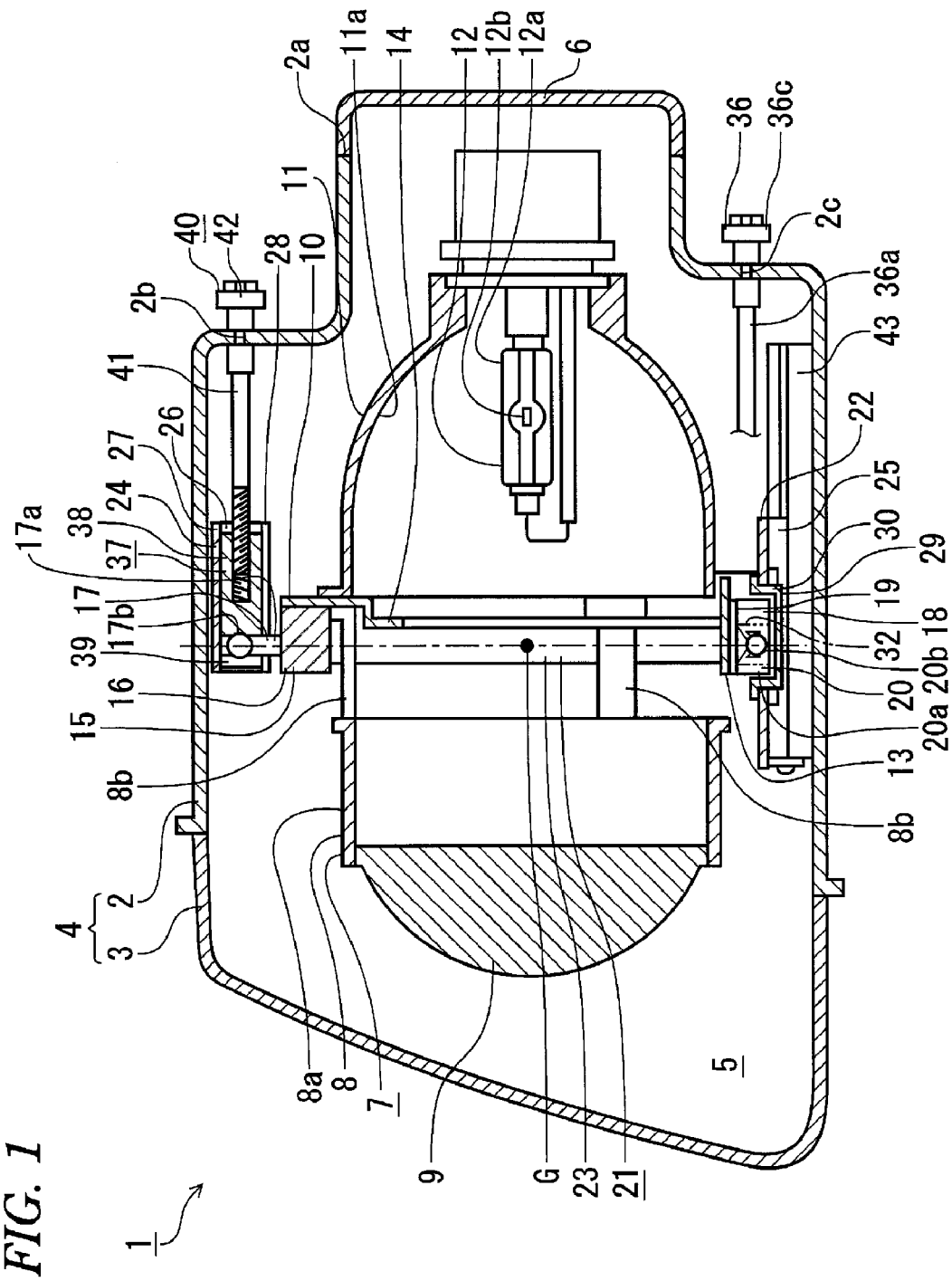
FIG. 1 is a perspective vertical sectional view showing a vehicle headlamp according to a first exemplary embodiment.

As shown in FIG. 1, the vehicle headlamp 1 is equipped with a lamp housing 2 having a concave section being open toward the front and a cover 3 for closing the opening face of the lamp housing 2. The lamp housing 2 and the cover 3 are combined to form an outer lamp housing 4, and the inner space of the outer lamp housing 4 is formed as a lamp chamber 5.

A mounting hole 2a, which passes through the lamp housing 2 in the front-rear direction, is formed at the rear end section of the lamp housing 2. A back cover 6 is installed to cover the mounting hole 2a.

Shaft insertion holes 2b and 2c, which pass through in the front-rear direction, are formed at positions near the rear end of the lamp housing 2 while being separated from each other in the up-down direction.

Figure 2:
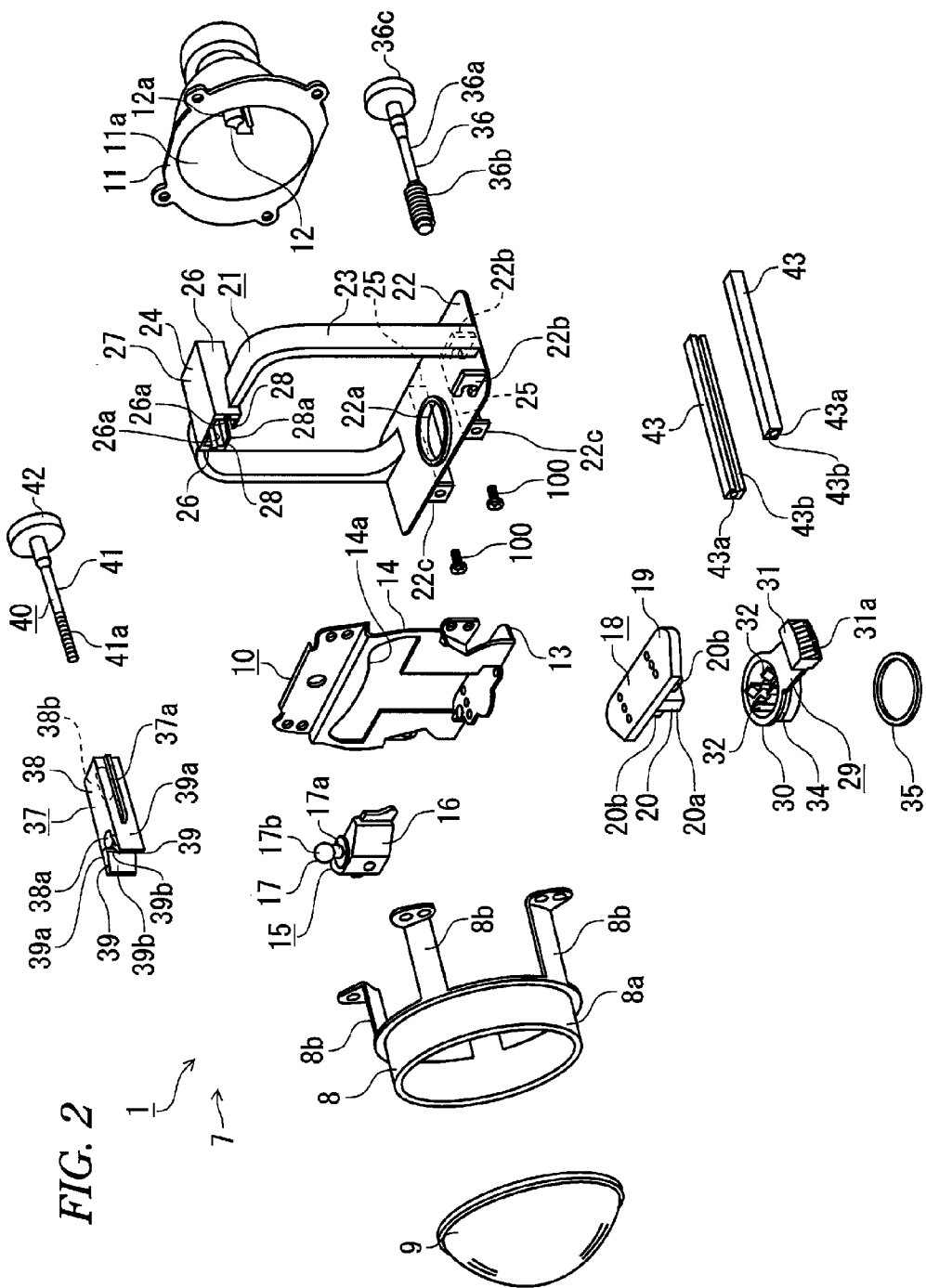
FIG. 2 is an exploded perspective view showing an inner configuration of the vehicle headlamp of the first exemplary embodiment.
Figure 3:
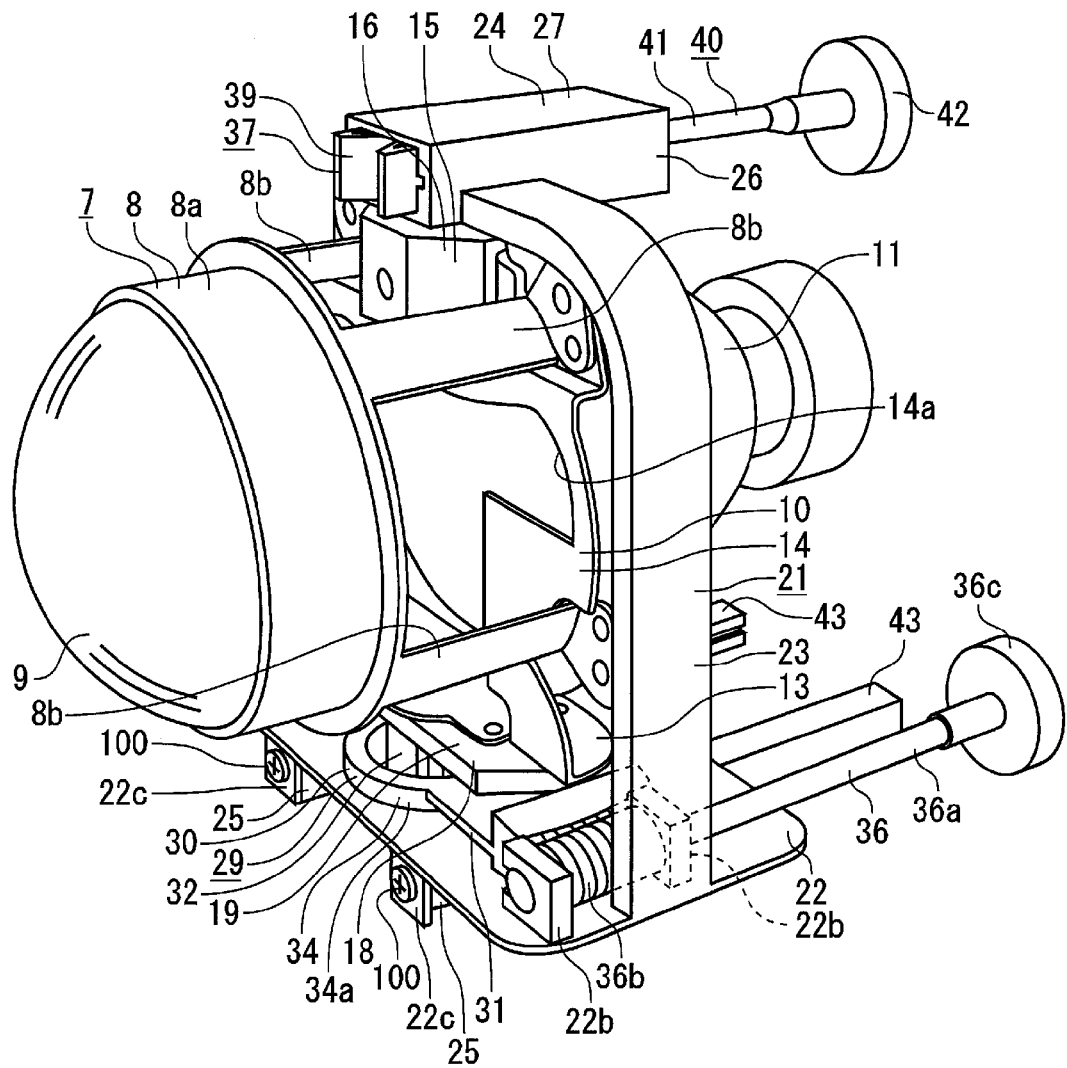
FIG. 3 is a perspective view showing the inner configuration of the vehicle headlamp of the first exemplary embodiment.

A lamp unit 7 is disposed in the lamp chamber 5 (see FIGS. 1 to 3). The lamp unit 7 has a lens holder 8; a projection lens 9 installed at the front end section of the lens holder 8; a bracket 10 on which the rear end sections of the lens holder 8 are installed; a reflector 11, the front end section of which is installed on the bracket 10; and a light source 12 installed at the rear end section of the reflector 11.

The lens holder 8 has a holding section 8a, which passes through in the front-rear direction and which is formed into a substantially cylindrical shape, and installation leg sections 8b, 8b, etc., which protrude rearward from the holding section 8a. The installation leg sections 8b, 8b, etc. are provided so as to be separated from one another in the circumferential direction.

The front side surface of the projection lens 9 is formed into a convex shape, and the rear side surface thereof is formed into a flat plane, which faces rearward. The projection lens functions to projecting the light emitted from the light source 12 forward while inverting an image on the focal plane including the rear side focal point thereof.

The bracket 10 has a base face section 13 oriented in the up-down direction and a mounting face section 14 protruding upward from the base face section 13. A transmission hole 14a, which passes through in the front-rear direction, is formed in the mounting face section 14. Part of the mounting plane section 14 of the bracket 10 functions as a shade for shielding part of the light emitted from the light source 12, and the light emitted from the light source 12 is transmitted forward through the transmission hole 14a.

The rear end sections of the installation leg sections 8b, 8b, etc. of the lens holder 8 are installed with screws or the like on the outer circumferential section of the mounting face section 14 of the bracket 10.

The inner face of the reflector 11 is formed as a reflecting face 11a, and the reflecting face 11a is formed into a substantially elliptic spherical face, for example. The reflecting face 11a is formed so that the primary focal point thereof is coincident with the light emitting section (described later) of the light source 12 and so that the secondary focal point thereof is coincident with the rear side focal point of the projection lens 9.

The front end section of the reflector 11 is installed with screws or the like on the outer circumferential section of the mounting face section 14 of the bracket 10.

The light source 12 is a discharge lamp, for example, and emits light from the light emitting section 12b thereof provided inside the outer pipe 12a thereof. The light emitted from the light emitting section 12b is directed forward or reflected by the reflecting face 11a of the reflector 11 and collected on the focal point face including the rear side focal point of the projection lens 9 and then projected forward as illumination light using the projection lens 9.

A first connection member 15 is installed with screws or the like on the front face of the upper end section on the mounting plane section 14 of the bracket 10. The first connection member 15 is formed from a "to be mounted section 16" that is mounted on the mounting plane section 14 and a first connection section 17 protruding upward from the "to be mounted section 16". The first connection section 17 is formed of a shaft section 17a extending in the up-down direction and a spherical section 17b provided at the upper end of the shaft section 17a.

A second connection member 18 is installed with screws or the like on the lower face of the base face section 13 of the bracket 10. The second connection member 18 is formed of a "to be mounted section 19" that is mounted on the base face section 13 and a second connection section 20 protruding downward from the "to be mounted section 19". The second connection section 20 is formed of a base section 20a and connection shaft sections 20b and 20b protruding leftward and rightward respectively from the base section 20a.

The first connection section 17 and the second connection section 20 are positioned substantially in an up-down direction, and the gravity center G of the lamp unit 7 is positioned between the first connection section 17 and the second connection section 20 (see FIG. 1).

A frame 21 is disposed in the lamp chamber 5 and secured to the lamp housing 2.

As shown in FIGS. 2 and 3, the frame 21 is integrally formed of a plate section 22 formed into a rectangular flat plate shape oriented in the up-down direction, a support frame section 23 formed into a U-shape being open downward and a slider support section 24 provided at the upper end section of the support frame section 23 and at the central section thereof in the right-left direction.

An insertion hole 22a passing through in the up-down direction is formed at the central section of the plate section 22 in the right-left direction. Bearing protrusion sections 22b and 22b, which protrude upward while being separated from each other in the front-rear direction, are provided on the left end section of the upper face of the plate section 22. To be secured sections 22c and 22c, separated from each other in the right-left direction, are provided at the front end section of the lower face of the plate section 22. The "to be mounted sections 22c and 22c" are formed into a flat plate shape oriented in the front-rear direction and each have a screw insertion hole passing through in the front-rear direction.

Figure 4:
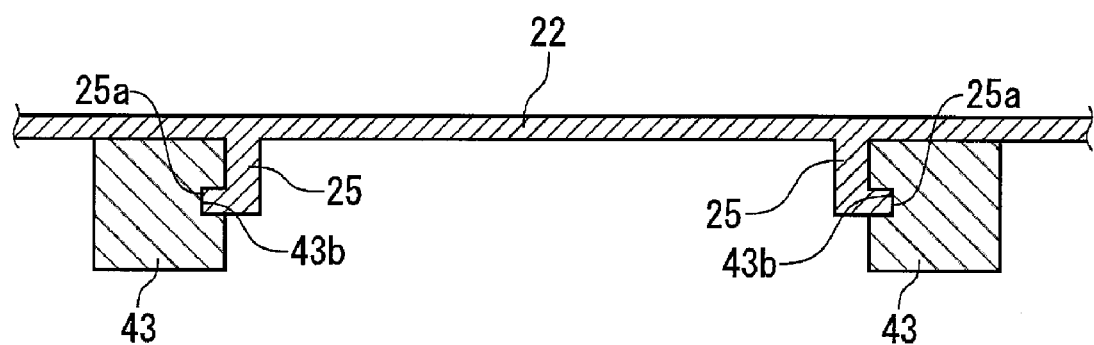
FIG. 4 is an enlarged sectional view showing a state in which protrusion rails are mounted on a load holding section in the vehicle headlamp of the first exemplary embodiment.

Protrusion rails 25 and 25 protruding downward and being separated from each other in the right-left direction are provided on the lower face of the plate section 22 (see FIG. 4). The protrusion rails 25 and 25 are provided so as to extend in the front-rear direction and respectively have engagement protrusion sections 25a and 25a, which protrude away from each other at the respective lower end sections thereof.

As shown in FIGS. 2 and 3, the slider support section 24 is formed into a substantially rectangular cylindrical shape extending in the front-rear direction and is formed of side plate sections 26 and 26, a top plate section 27 for connecting the upper end sections of the side plate sections 26 and 26, and bottom plate sections 28 and 28, which protrude toward each other from the lower end sections of the side plate sections 26 and 26. Support grooves 26a and 26a extending in the front-rear direction are formed in the inner faces of the side plate sections 26 and 26, respectively. A slit 28a extending in the front-rear direction is formed between the bottom plate sections 28 and 28.

Figure 5:
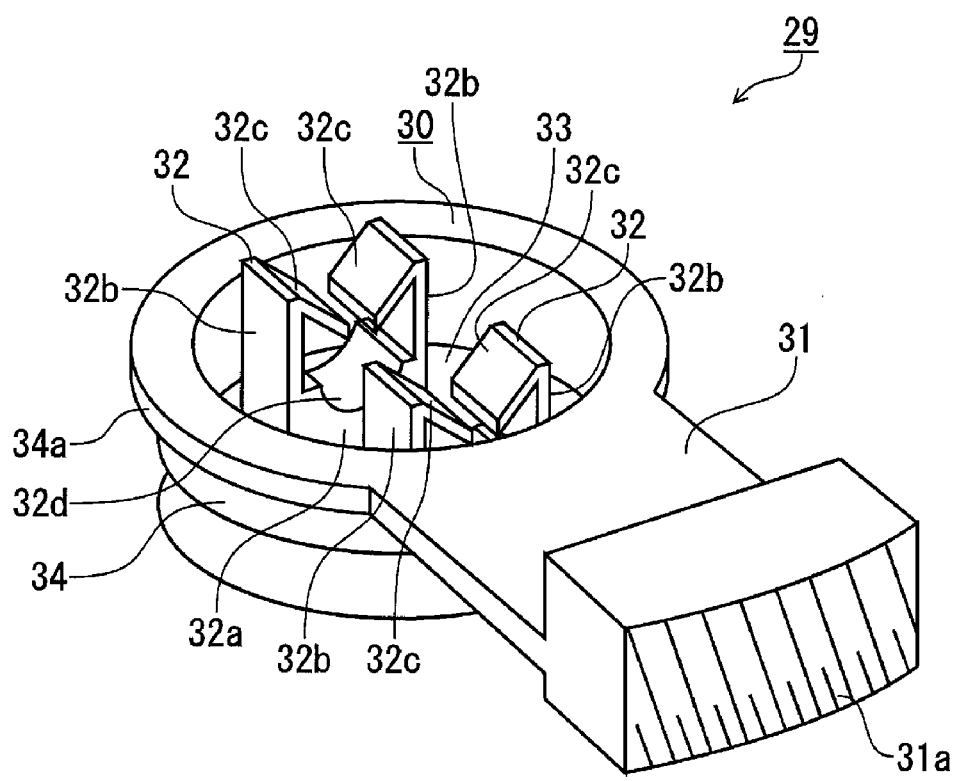
FIG. 5 is an enlarged perspective view showing a rotor in the vehicle headlamp of the first exemplary embodiment.

A rotor 29 is turnably supported on the plate section 22 of the frame 21. As shown in FIG. 5, the rotor 29 is integrally formed of a rotation base section 30 being open upward and having a substantially circular outer shape, a working protrusion section 31 protruding sideways from the upper end section of the rotation base section 30, and shaft support sections 32 and 32 protruding upward from the rotation base section 30.

The rotation base section 30 is formed of a bottom face section 33 having a disc shape and a circumferential face section 34 protruding upward from the outer circumferential section of the bottom face section 33, and the upper end section of the circumferential face section 34 is provided as a flange section 34a extending outward. The outside diameter of the circumferential face section 34 of the rotation base section 30 is made smaller than the diameter of the insertion hole 22a formed in the plate section 22 of the frame 21, and the outside diameter of the flange section 34a is made larger than the diameter of the insertion hole 22a.

The end face of the working protrusion section 31 is formed into a circular arc shape gently protruding outward, and a gear section 31a is formed on this end face.

The shaft support sections 32 and 32 are provided so as to protrude upward from the bottom face section 33 and to be separated from each other in the right-left direction. The shaft support section 32 is formed of a base section 32a, which protrudes upward from the bottom face section 33, protrusion sections 32b and 32b, which protrude upward from both the front and rear end sections of the base section 32a, respectively, and holding protrusion sections 32c and 32c folded back from the upper ends of the protrusion sections 32b and 32b, respectively, and inclined in directions of becoming closer to each other as they extend downward. A shaft support face 32d having a circular arc shape and extending in the right-left direction is formed on the upper face of the base section 32a. The protrusion sections 32b and 32b and the holding protrusion sections 32c and 32c of the shaft support section 32 are deformable elastically.

The rotation base section 30 of the rotor 29, excluding the flange section 34a, is inserted into the insertion hole 22a formed in the plate section 22 of the frame 21 from above and supported so as to be turnable with respect to the plate section 22. In a state in which the rotor 29 is supported on the plate section 22, an O-ring 35 is fitted on the circumferential face section 34, thereby preventing the rotor 29 from coming off the plate section 22.

A rotation operation section 36 is rotatably supported on the plate section 22 of the frame 21 (see FIGS. 1 to 3). The rotation operation section 36 is formed of a shaft section 36a extending in the front-rear direction, a worm gear 36b provided at the front end of the shaft section 36a, and an operation section 36c provided at the rear end of the shaft section 36a.

The rotation operation section 36 is inserted into the lower shaft insertion hole 2c formed in the lamp housing 2 and supported on the lamp housing 2 so that the rotation operation section 36 can rotate around its axis but cannot move in its axial direction.

The rotation operation section 36 is inserted into the bearing protrusion sections 22b and 22b of the plate section 22 and supported on the plate section 22 so as to be rotatable around the axis of the shaft section 36a. In a state in which the rotation operation section 36 is supported on the plate section 22, the worm gear 36b is positioned between the bearing protrusion sections 22b and 22b and engages with the gear section 31a of the rotor 29.

A slider 37 is supported on the slider support section 24 of the frame 21 so as to be movable in the front-rear direction. The slider 37 is formed of a main body section 38 having a block shape being long in the front-rear direction and a shaft support section 39 protruding forward from the front face of the main body section 38. Protrusion sections 37a and 37a, which protrude outward and extend in the front-rear direction, are provided on both the left and right side faces of the slider 37, respectively.

A shaft support face 38a having a semicircular arc shape and extending in the up-down direction is formed on the front face of the main body section 38. A threaded hole 38b extending in the front-rear direction and being open to the rear face of the main body section 38 is formed in the main body section 38.

The shaft support section 39 is formed of protrusion sections 39a and 39a, which protrude forward from both the left and right end sections of the front face of the main body section 38, respectively, and holding protrusion sections 39b and 39b, which are folded back from the front ends of the protrusion sections 39a and 39a and are inclined to become closer to each other as they extend rearward. The shaft support section 39 is elastically deformable with respect to the main body section 38.

The protrusion sections 37*a* and 37*b* of the slider 37 are slidably engaged with the support grooves 26*a* and 26*a*, respectively, whereby the slider 37 is supported on the slider support section 24 of the frame 21 so as to be movable in the front-rear direction.

A drive operation section 40 threadedly engages with the slider 37. The drive operation section 40 is formed of a shaft section 41, which extends in the front-rear direction and an operation section 42 provided at the rear end of the shaft section 41. A threaded shaft section 41*a* is formed at the front end section of the shaft section 41.

The drive operation section 40 is inserted into the upper shaft insertion hole 2*b* formed in the lamp housing 2 and supported on the lamp housing 2 so that the drive operation section 40 can rotate around its axis but cannot move in its axial direction.

The threaded shaft section 41*a* of the drive operation section 40 is inserted into the threaded hole 38*b* of the slider 37 and threadedly engages therewith.

On the inner face of the lower face section of the lamp housing 2, load holding sections 43 and 43, which are separated from each other in the right-left direction, are, for example, provided so as to be integrated with the lamp housing 2. The load holding sections 43 and 43 are each formed into a square bar extending in the front-rear direction and have threaded holes 43*a* and 43*a* being open in the front faces respectively thereof. Engaging grooves 43*b* and 43*b* extending in the front-rear direction are formed on the opposed faces of the load holding sections 43 and 43, respectively.

In the lamp unit 7, the shaft section 17*a* of the first connection section 17 is inserted into the slit 28*a* from the front side, and the spherical section 17*b* is inserted between the holding protrusion sections 39*b* and 39*b* of the slider 37 from the front side, thereby being connected to the slider 37 and supported thereon. At this time, as the spherical section 17*b* is inserted, the protrusion sections 39*a* and 39*a* and the holding protrusion sections 39*b* and 39*b* are elastically deformed away from each other and then elastically returned. As a result, the spherical section 17*b* is held with the shaft support face 38*a* and the holding protrusion sections 39*b* and 39*b* of the main body section 38.

In a state in which the spherical section 17*b* is connected to the slider 37, the lamp unit 7 is turnable in a given direction with respect to the slider 37 around the spherical section 17*b* as a fulcrum. Hence, the lamp unit 7 is turnable in the horizontal direction around the spherical section 17*b* as a fulcrum and tiltable substantially in an up-down direction around the spherical section 17*b* as a fulcrum, for example.

Furthermore, in the lamp unit 7, the connection shaft sections 20*b* and 20*b* of the second connection section 20 are inserted between the holding protrusion sections 32*c* and 32*c* on one side of the rotor 29 and between the holding protrusion sections 32*c* and 32*c* of the other side thereof from above, respectively, thereby being connected to the rotor 29 and supported thereon. At this time, as the connection shaft section 20*b* is inserted, the protrusion sections 32*b* and 32*b* and the holding protrusion sections 32*c* and 32*c* are elastically deformed away from each other and then elastically returned. As a result, the connection shaft section 20*b* is held with the shaft support face 32*d* of the base section 32*a* and the holding protrusion sections 32*c* and 32*c*.

In a state in which the connection shaft sections 20*b* and 20*b* are connected to the rotor 29, the lamp unit 7 is tiltable substantially in an up-down direction around the connection shaft sections 20*b* and 20*b* as fulcrums.

The engagement protrusion section 25*a* and 25*a* of the protrusion rails 25 and 25 provided on the lower face side of the plate section 22 of the frame 21 are inserted into the engaging grooves 43*b* and 43*b* of the load holding sections 43 and 43 and engaged therewith, respectively (see FIG. 4). In this state, the "to be mounted sections 22*c* and 22*c*" of the plate section 22 make contact with the front faces of the load holding sections 43 and 43, respectively, and mounting screws 100 and 100 are inserted into the screw insertion holes of the "to be mounted sections 22*c* and 22*c*" and are threadedly engaged with the threaded holes 43*a* and 43*a* of the load holding sections 43 and 43, respectively. As a result, the frame 21 is secured to the load holding sections 43 and 43 of the lamp housing 2.

Since the engagement protrusion sections 25*a* and 25*a* of the protrusion rails 25 and 25 of the frame 21 are engaged with the engaging grooves 43*b* and 43*b* of the load holding sections 43 and 43, respectively, the frame 21 and the lamp unit 7 can be prevented from floating with respect to the load holding sections 43 and 43.

In addition, since the frame 21 is secured to the load holding sections 43 and 43 provided as part of the lamp housing 2, the loads of the frame 21 and the lamp unit 7 are received by the lamp housing 2. Hence, the arrangement state of the frame 21 and the lamp unit 7 in the lamp chamber 5 is stabilized, and the frame 21 and the lamp unit 7 are hardly affected by the vibration occurring during the traveling of a vehicle, for example. Consequently, the vibration resistance of the vehicle headlamp can be improved.

In the above-mentioned vehicle headlamp 1, when the operation section 36*c* of the rotation operation section 36 is operated and the worm gear 36*b* is rotated, the gear section 31*a* is fed in the direction corresponding to the rotation direction of the worm gear 36*b*, and the rotor 29 is turned with respect to the plate section 22 of the frame 21. When the rotor 29 is turned, the lamp unit 7 is turned in the horizontal direction around the axis connecting the first connection section 17 and the second connection section 20, as the rotor 29 is turned. Since the lamp unit 7 is turned, the irradiation direction of the light emitted from the light source 12 and irradiated via the projection lens 9 is changed, and optical axis adjustment in the right-left direction, that is, the so-called right-left aiming adjustment, is carried out. At this time, the spherical section 17*b* of the first connection section 17 is rotated with respect to the slider 37.

On the other hand, when the operation section 42 of the drive operation section 40 is operated and the threaded shaft section 41*a* is rotated, the threaded hole 38*b* is fed in the direction corresponding to the rotation direction of the threaded shaft section 41*a*, and the slider 37 is moved in the front-rear direction with respect to the slider support section 24 of the frame 21. When the slider 37 is moved in the front-rear direction, the lamp unit 7 is tilted substantially in the up-down direction around the second connection section 20 as a fulcrum. Since the lamp unit 7 is tilted substantially in the up-down direction, the irradiation direction of the light emitted from the light source 12 and irradiated via the projection lens 9 is changed, and optical axis adjustment in the up-down direction, that is, the so-called up-down aiming adjustment, is carried out. At this time, the spherical section 17*b* of the first connection section 17 is rotated with respect to the slider 37.

An example is described above in which the rotor 29 is positioned downward and the slider 37 is positioned upward.

Conversely, it is possible to adopt a configuration in which the rotor 29 is positioned upward and the slider 37 is positioned downward.

Second Exemplary Embodiment

A vehicle headlamp 1A according to a second exemplary embodiment will be described below (see FIGS. 6 to 9).

The vehicle headlamp 1A described below differs from the above-mentioned vehicle headlamp 1 in that, for example, in addition to aiming adjustment, the so-called leveling adjustment, in which the direction of the optical axis that is changed depending on the weight of a load on a vehicle, is carried out. Hence, only the components of the vehicle headlamp 1A that are different from those of the vehicle headlamp 1 will be described below in detail, and other components, which are similar, are not described or are described in brief if necessary, while the same reference codes as the reference codes assigned to the components of the vehicle headlamp 1 are assigned.

Figure 6:
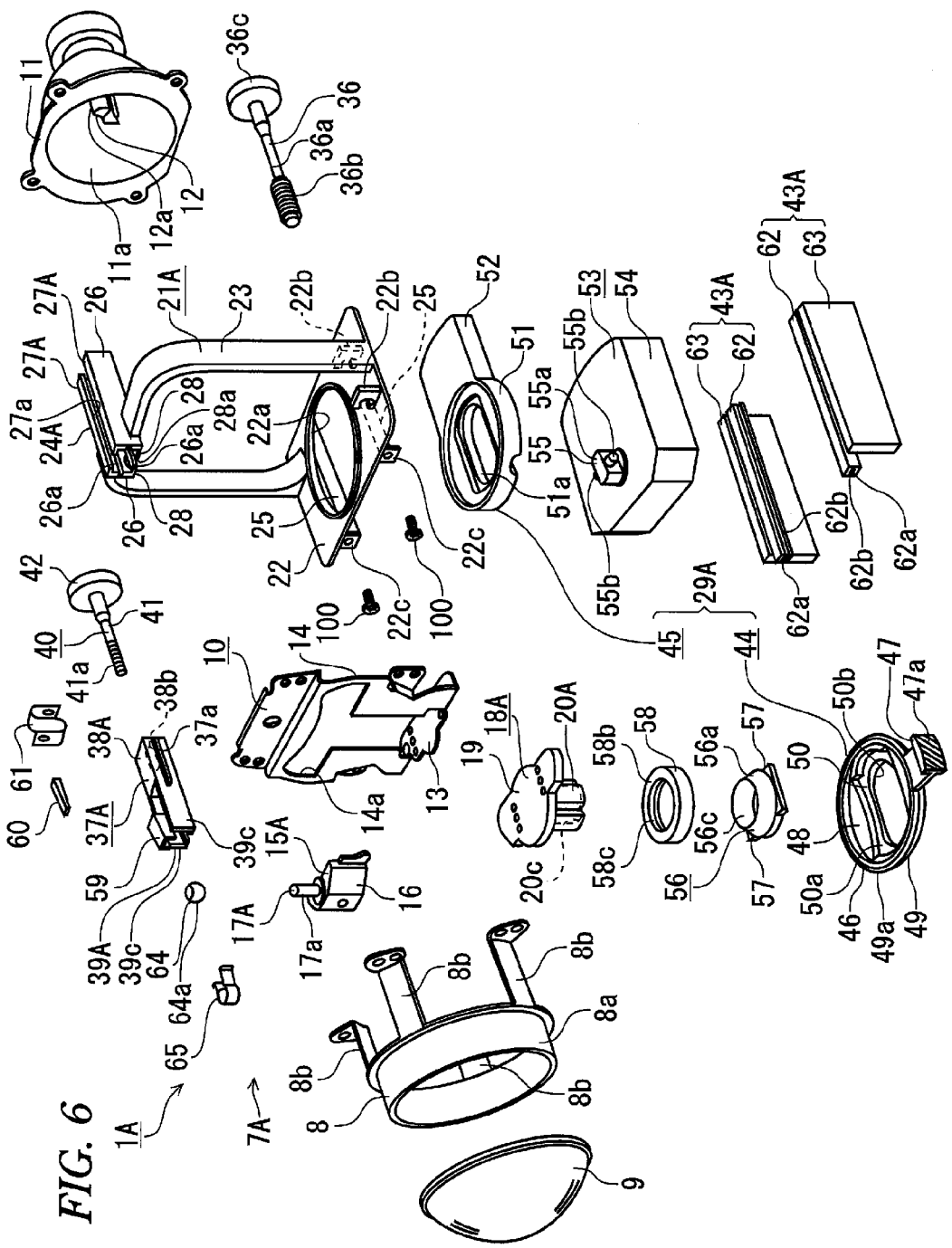
FIG. 6 is an exploded perspective view showing an inner configuration of a vehicle headlamp according to a second exemplary embodiment.
Figure 7:
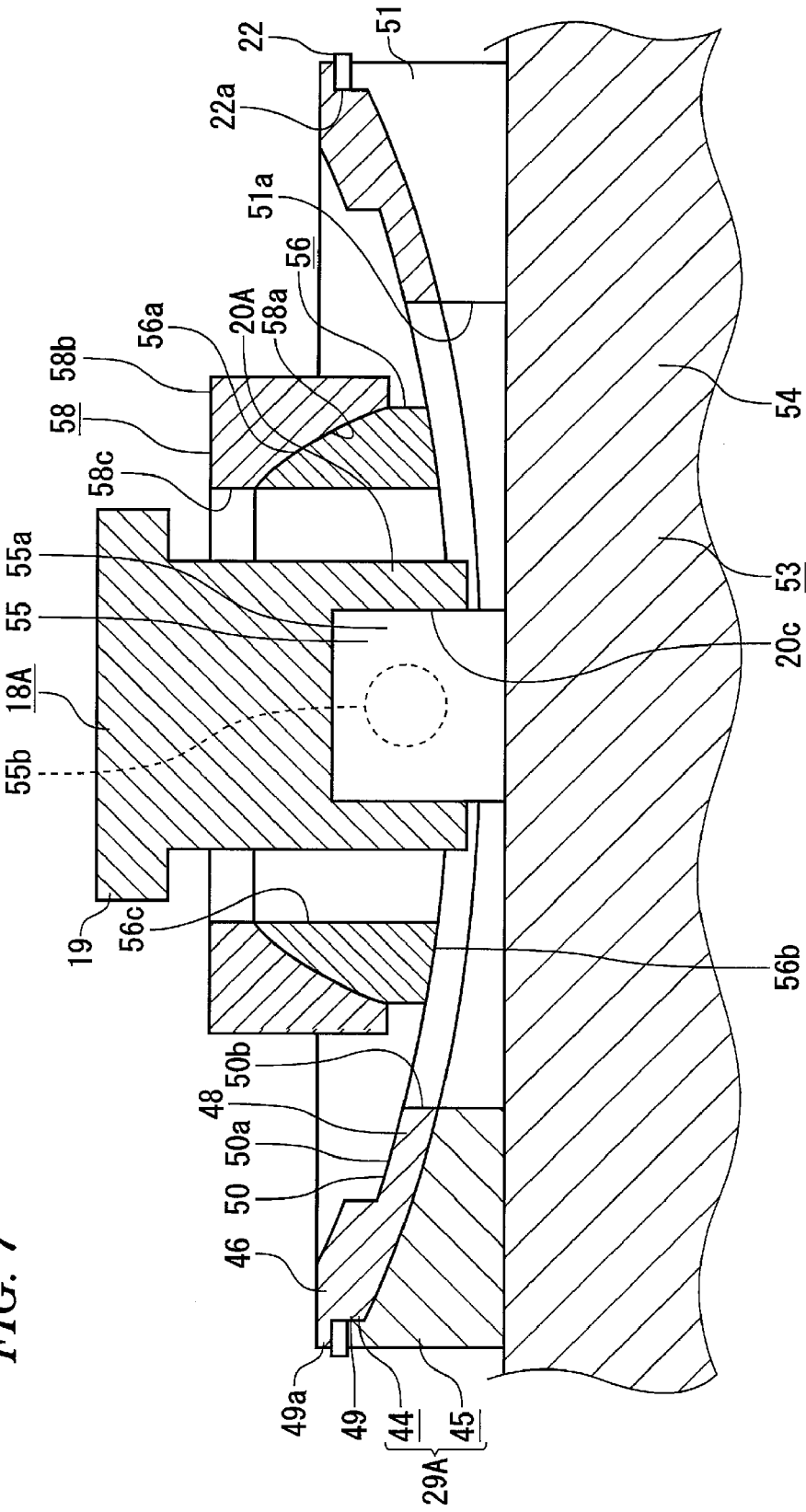
FIG. 7 is an enlarged sectional view showing a connection state of a rotor, a first washer, a second washer, etc. in the vehicle headlamp of the second exemplary embodiment.

As shown in FIG. 6, the lamp unit 7A of the vehicle headlamp 1A has a lens holder 8, a projection lens 9, a bracket 10, a reflector 11, and a light source 12.

A first connection member 15A is installed with screws or the like on the front face of the upper end section on the installation face section 14 of the bracket 10. The first connection member 15A is formed of a "to be mounted section 16" and a first connection section 17A protruding upward from the "to be mounted section 16". The first connection section 17A is formed of a shaft section 17a.

A second connection member 18A is installed with screws or the like on the lower face of the base face section 13 of the bracket 10. The second connection member 18A is formed of a "to be mounted section 19" and a second connection section 20A protruding downward from the "to be mounted section 19". The second connection section 20A has a fitting concave section 20c being open downward.

The first connection section 17A and the second connection section 20A are positioned substantially in an up-down direction, and the gravity center G of the lamp unit 7A is positioned between the first connection section 17A and the second connection section 20A.

A frame 21A is disposed in the lamp chamber 5 and secured to the lamp housing 2.

The frame 21A is integrally formed of a plate section 22, a support frame section 23 and a slider support section 24A provided at the upper end section of the support frame section 23 and at the central section thereof in the right-left direction.

The slider support section 24A is formed of side plate sections 26 and 26, top plate sections 27A and 27A protruding from the upper end sections of the side plate sections 26 and 26 in directions of becoming close to each other, and bottom plate sections 28 and 28. A slit 27a extending in the front-rear direction is formed between the top plate sections 27A and 27A.

A rotor 29A is turnably supported at the plate section 22 of the frame 21A. The rotor 29A is configured such that a spacer 44 and a rotor base 45 are connected to each other with the plate section 22 held therebetween in the up-down direction (see FIGS. 6 and 7).

The spacer 44 is integrally formed of a rotation base section 46 having a circular outer shape and a working protrusion section 47 protruding sideways from the upper end section of the rotation base section 46.

The rotation base section 46 is formed of a bottom face section 48 and a circumferential face section 49 protruding upward from the outer circumferential section of the bottom face section 48, and the upper end section of the circumferential face section 49 is provided as a flange section 49a extending outward. The outside diameter of the circumferential face section 49 of the rotation base section 46 is made smaller than the diameter of the insertion hole 22a formed in the plate section 22 of the frame 21A, and the outside diameter of the flange section 49a is made larger than the diameter of the insertion hole 22a.

A sliding concave section 50 being open upward is formed at portions excluding both the left and right end sections of the bottom face section 48, and the bottom face of the sliding concave section 50 is formed into a circular arc face 50a gently protruding downward. A protrusion section insertion hole 50b being long in the front-rear direction is formed at portions excluding the outer circumferential section of the sliding concave section 50.

The end face of the working protrusion section 47 is formed into a circular arc shape gently protruding outward, and a gear section 47a is formed on this end face.

The rotor base 45 is integrally formed of a circular section 51 and a protrusion section 52 protruding rearward from the circular shape 51. A protrusion section insertion hole 51a, which is long in the front-rear direction, is formed in the circular section 51, and the shape and the size of the protrusion section insertion hole 51a are the same as those of the protrusion section insertion hole 50b formed in the bottom face section 48 of the spacer 44.

The rotation base section 46 of the spacer 44, excluding the flange section 49a, is inserted into the insertion hole 22a formed in the plate section 22 of the frame 21A from above and supported so as to be turnable with respect to the plate section 22.

In a state in which the spacer 44 is supported on the plate section 22, the rotation base section 46 of the spacer 44 is connected to the circular section 51 of the rotor base 45 with screws, for example. Hence, the spacer 44 and the rotor base 45 are integrally rotated in the horizontal direction with respect to the plate section 22. The connection of the rotation base section 46 to the circular section 51 is carried out, for example, by forming a convex section on one of the components, by forming a concave section on the other component, by fitting the convex section into the concave section via the insertion hole 22a of the plate section 22, and by threadedly engaging screw members inserted into the convex section with the rotation base section 46 or the circular section 51.

An actuator 53 is disposed below the rotor base 45. The actuator 53 is supported on the rotor base 45 of the rotor 29A so as to be movable in the front-rear direction, and is moved in the front-rear direction by a movement mechanism, not shown. The actuator 53 has a drive section 54 and a connecting shaft 55 that is rotated by the drive section 54.

The connecting shaft 55 protrudes upward from the drive section 54 and is rotated around its axis (in the horizontal direction) by the drive section 54. The connecting shaft 55 has a rotation shaft section 55a and connection shaft sections 55b and 55b protruding leftward and rightward from the rotation shaft section 55a, respectively.

In a state in which the actuator 53 is supported on the rotor 29A, the connecting shaft 55 is positioned in the protrusion section insertion hole 50b of the spacer 44 and in the protrusion section insertion hole 51a of the rotor base 45.

A first washer 56 is supported on the spacer 44 so as to be movable in the front-rear direction. The first washer 56 is formed into a substantially cylindrical shape, the axial direction of which is the up-down direction, and has sliding protrusion sections 57 and 57 extending leftward and rightward at the lower end section thereof, respectively.

The outer circumferential face of the first washer 56 is formed into a spherical face 56a so as to become closer to the center of its axis as the outer circumferential face extends upward, and the lower face thereof is formed into a circular arc face 56b gently protruding downward. The curvature of the circular arc face 56b of the first washer 56 is the same as the curvature of the circular arc face 50a of the spacer 44. The center hole of the first washer 56 is formed as a protrusion section insertion hole 56c.

The lower end section of the first washer 56 is inserted into the sliding concave section 50 of the rotation base section 46 from above, and the sliding protrusion sections 57 and 57 are guided by both the left and right side fringes of the sliding concave section 50, respectively, and supported by the spacer 44 so as to be movable in the front-rear direction. When the first washer 56 is moved with respect to the spacer 44, the circular arc face 56b of the first washer 56 makes slide contact with the circular arc face 50a of the spacer 44, and the first washer 56 is moved along a circular arc locus gently protruding downward.

A second washer 58 is rotatably supported on the first washer 56. The second washer 58 is formed into a substantially annular shape, the axial direction of which is the up-down direction. The second washer 58 is supported on the first washer 56 in a state in which the second washer 58 covers the spherical face 56a of the first washer 56 from above. The face of the second washer 58 making contact with the spherical face 56a is formed into a spherical face 58a corresponding to the shape of the spherical face 56a. The upper face of the second washer 58 is formed into a horizontal face so as to serve as a sliding face 58b, and the center hole of the second washer 58 is formed as a protrusion section insertion hole 58c.

A rotation operation section 36 is rotatably supported on the plate section 22 of the frame 21A. In a state in which the rotation operation section 36 is supported on the plate section 22, a worm gear 36b is positioned between bearing protrusion sections 22b and 22b and engaged with the gear section 47a of the rotor 29A.

A slider 37A is supported on the slider support section 24A of the frame 21A so as to be movable in the front-rear direction. The slider 37A is formed of a main body section 38A and a shaft support section 39A protruding forward from the front face of the main body section 38A. Protrusion sections to be supported 37a and 37a protruding outward and extending in the front-rear direction are provided on both the left and right side faces of the slider 37A, respectively.

A threaded hole 38b extending in the front-rear direction and being open to the rear face of the main body section 38A is formed in the main body section 38A.

The shaft support section 39A has protrusion sections 39c and 39c protruding forward from both the left and right end sections of the front face of the main body section 38A, respectively.

The protrusion sections to be supported 37a and 37b of the slider 37A are slidably engaged with the support grooves 26a and 26a, respectively, whereby the slider 37A is supported on the slider support section 24A of the frame 21A so as to be movable in the front-rear direction.

A drive operation section 40 is threadedly engaged with the slider 37A. The threaded shaft section 41a of the drive operation section 40 is inserted into the threaded hole 38b of the slider 37A and threadedly engaged therewith.

Figure 8:
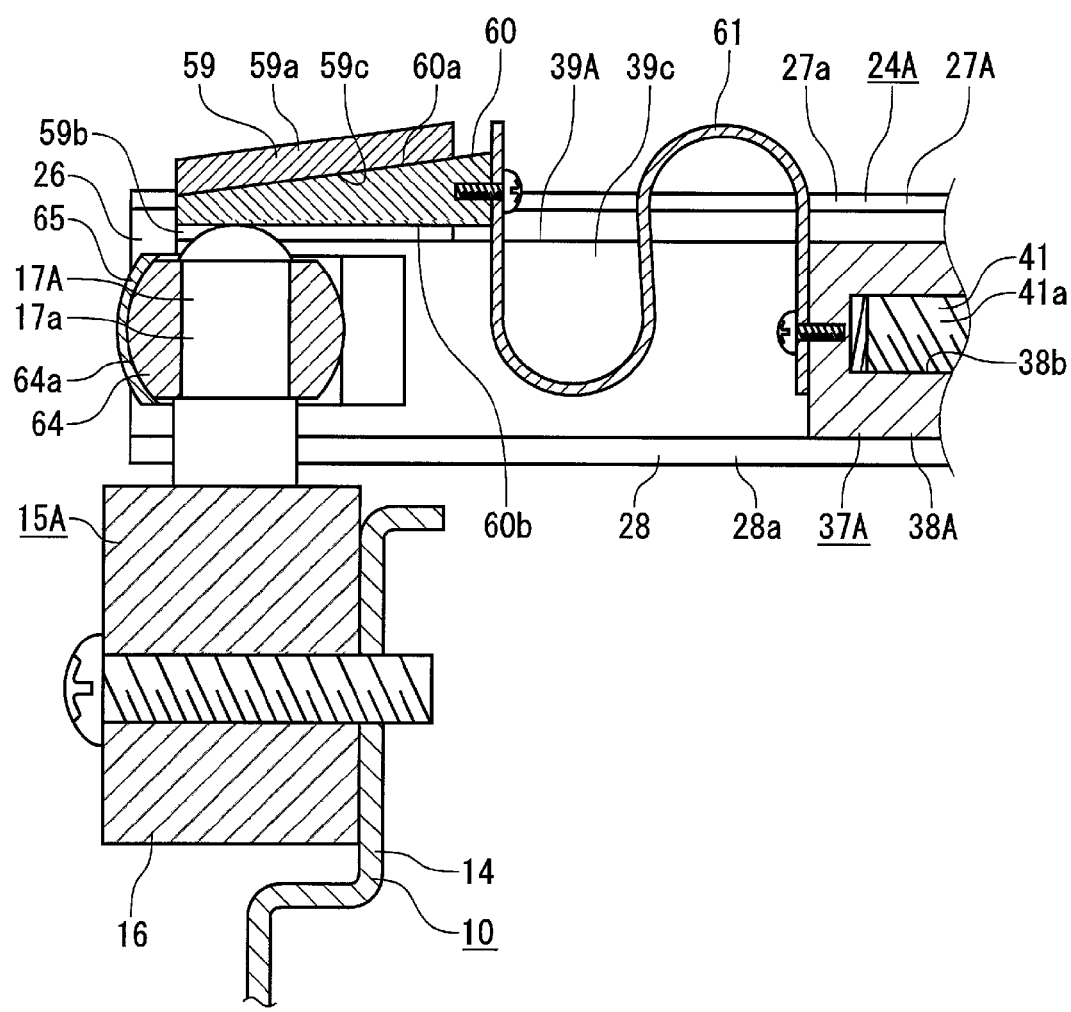
FIG. 8 is an enlarged sectional view showing a state in which a holding member, a pressing member, etc. are supported on a slider in the vehicle headlamp of the second exemplary embodiment.

A holding member 59 is secured to the protrusion sections 39c and 39c of the slider 37A (see FIG. 8). The holding member 59 has a top face section 59 and side face sections 59b and 59b protruding downward from both the left and right end sections of the top face section 59a, respectively. The side face sections 59b and 59b are secured with an adhesive or the like to the upper faces of the front end sections of the protrusion sections 39c and 39c, respectively. The lower face of the top face section 59a is formed as a supporting slope face 59c that is inclined gently upward in the rearward direction.

A pressing member 60 is disposed below the holding member 59. The pressing member 60 is formed into a wedge shape. More specifically, the upper face thereof is formed as a sliding slope face 60a that is inclined gently upward in the rearward direction, and the lower face thereof is formed as a pressing face 60b facing directly downward. The inclination angle of the sliding slope face 60a is the same as the inclination angle of the supporting slope face 59c of the holding member 59.

The end sections of a biasing spring 61 are respectively secured with screws or the like to the front face of the main body section 38A of the slider 37A and to the rear face of the pressing member 60. The biasing force of the biasing spring 61 is applied to the pressing member 60 as a force for moving the pressing member 60 forward. As a result, the pressing member 60 is biased by the biasing spring 61 in a direction in which the sliding slope face 60a is pressed against the supporting slope face 59c of the holding member 59.

On the inner face of the lower face section of the lamp housing 2, load holding sections 43A and 43A being separated from each other in the right-left direction are, for example, provided so as to be integrated with the lamp housing 2.

The load holding sections 43A and 43A are formed of holding bodies 62 and 62 each formed into a square bar extending in the front-rear direction and auxiliary walls 63 and 63 positioned on the outsides of the holding bodies 62 and 62.

The holding bodies 62 and 62 have threaded holes 62a and 62a being open in the front faces thereof, respectively. Engaging grooves 62b and 62b extending in the front-rear direction are formed on the opposed faces of the holding bodies 62 and 62, respectively.

The auxiliary walls 63 and 63 are formed into a plate shape oriented in the right-left direction. The width of each of the auxiliary walls 63 and 63 in the up-down direction is made larger than the width of each of the holding bodies 62 and 62 in the up-down direction, and the upper face of each of the auxiliary walls 63 and 63 is positioned as high as the upper face of each of the holding bodies 62 and 62.

In the lamp unit 7A, the shaft section 17a of the first connection section 17A is connected to the slider 37A and supported thereon via a bearing member 64 and a plate spring 65 (see FIG. 8).

The outer circumferential face 64a of the bearing member 64 is formed into a spherical face and rotatably connected to the shaft section 17a. Hence, the shaft section 17a is rotatable around its axis with respect to the bearing member 64.

The plate spring 65 is formed into a substantially U-shape, which is open rearward, and is installed on the shaft support section 39A of the slider 37A. The plate spring 65 is installed so as to cover the bearing member 64 from the front side, whereby the bearing member 64 is rotatable in a given direction with respect to the plate spring 65. Hence, the shaft section 17a is rotatable around its axis with respect to the bearing member 64 and is tilted with respect to the slider 37A as the bearing member 64 rotates with respect to the plate spring 65.

In a state in which the shaft section 17a of the first connection section 17A is connected to the slider 37A and supported thereon via the bearing member 64 and the plate spring 65, the pressing face 60a of the pressing member 60 makes contact with the upper end of the shaft section 17a, and the shaft section 17a is pressed downward by the pressing member 60.

In a state in which the shaft section 17a of the first connection section 17A is connected to the slider 37A and supported thereon via the bearing member 64 and the plate spring 65, the lamp unit 7A is turnable in a given direction with respect to the slider 37A around the shaft section 17a. Hence, the lamp unit 7A is turnable in the horizontal direction around the shaft section 17a and tiltable substantially in an up-down direction around the shaft section 17a.

Furthermore, in the lamp unit 7A, the second connection section 20A is connected to the connecting shaft 55 of the actuator 53, and the rotation shaft section 55a and the connection shaft sections 55b and 55b are inserted into the concave fitting section 20c of the second connection section 20A and fitted therein. At this time, the second connection section 20A is inserted into the protrusion section insertion hole 58c of the second washer 58, the protrusion section insertion hole 56c of the first washer 56, the protrusion section insertion hole 50b of the spacer 44 and the protrusion section insertion hole 51a of the rotor base 45 in this order from above, and then connected to the connecting shaft 55.

In a state in which the second connection section 20A is connected to the connecting shaft 55, the lamp unit 7A is tiltable substantially in an up-down direction around the connection shaft sections 55b and 55b In addition, the actuator 53 is moved in the front-rear direction with respect to the rotor 29A by the movement mechanism, whereby the lamp unit 7A is tiltable substantially in the up-down direction around the shaft section 17a.

The engagement protrusion sections 25a and 25a of the protrusion rails 25 and 25 are provided on the lower face side of the plate section 22 of the frame 21A and are inserted into the engaging grooves 62b and 62b of the holding bodies 62 and 62 of the load holding sections 43A and 43A and engaged therewith, respectively. In this state, the "to be mounted sections 22c and 22c" of the plate section 22 make contact with the front faces of the holding bodies 62 and 62, respectively, and mounting screws 100 and 100 are inserted into the screw insertion holes of the "to be mounted sections 22c and 22c" and are threadedly engaged with the threaded holes 62a and 62a of the holding bodies 62 and 62, respectively. As a result, the frame 21A is secured to the load holding sections 43A and 43A of the lamp housing 2. At this time, the plate section 22 of the frame 21A is placed on the upper faces of the holding bodies 62 and 62 and the upper faces of the auxiliary walls 63 and 63 in the load holding sections 43A and 43A.

Since the engagement protrusion sections 25a and 25a of the protrusion rails 25 and 25 of the frame 21A are engaged with the engaging grooves 62b and 62b of the holding bodies 62 and 62, respectively, the frame 21A and the lamp unit 7A can be prevented from floating with respect to the load holding sections 43A and 43A.

In addition, since the frame 21A is secured to the load holding sections 43A and 43A provided as part of the lamp housing 2, the loads of the frame 21A and the lamp unit 7A are received by the lamp housing 2. Hence, the arrangement state of the frame 21A and the lamp unit 7A in the lamp chamber 5 is stabilized, and the frame 21A and the lamp unit 7A are hardly affected by the vibration occurring during the traveling of a vehicle, for example. Consequently, the vibration resistance of the vehicle headlamp can be improved.

In the above-mentioned vehicle headlamp 1A, when the operation section 36c of the rotation operation section 36 is operated and the worm gear 36b is rotated, the gear section 47a is fed in the direction corresponding to the rotation direction of the worm gear 36b, and the rotor 29A, the actuator 53 and the first washer 56 are integrally turned with respect to the plate section 22 of the frame 21A. When the rotor 29A is turned, the lamp unit 7A is turned in the horizontal direction around the axis connecting the first connection section 17A and the second connection section 20A, as the rotor 29A is turned. Since the lamp unit 7A is turned, right-left aiming adjustment is carried out. At this time, the shaft section 17a of the first connection section 17A is rotated with respect to the slider 37A.

Furthermore, at this time, the "to be mounted section 19" of the second connection member 18A makes slide contact with the sliding face 58b of the second washer 58. Since the sliding face 58b is a horizontal face, the lamp unit 7A is securely turned in the horizontal direction, and a stable turning state of the lamp unit 7A is securely obtained.

On the other hand, when the operation section 42 of the drive operation section 40 is operated and the threaded shaft section 41a is rotated, the threaded hole 38b is fed in the direction corresponding to the rotation direction of the threaded shaft section 41a, and the slider 37A is moved in the front-rear direction with respect to the slider support section 24A of the frame 21A. When the slider 37A is moved in the front-rear direction, the lamp unit 7A is tilted substantially in the up-down direction around the second connection section 20A as a fulcrum. Since the lamp unit 7A is tilted substantially in the up-down direction, up-down aiming adjustment is carried out.

Figure 9:
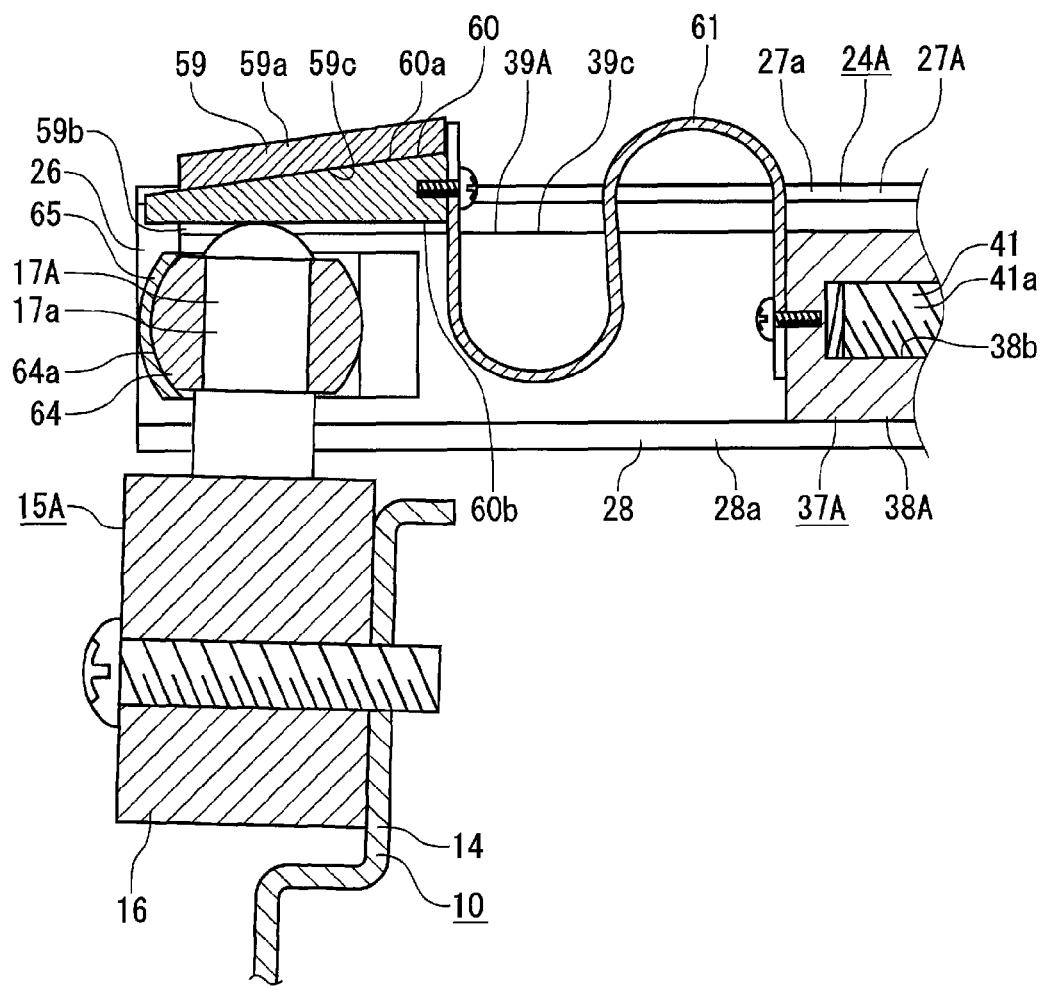
FIG. 9 is an enlarged sectional view showing a state in which the holding member, the pressing member, etc. are supported on the slider in the vehicle headlamp of the second exemplary embodiment when the position of a first connection section is changed.

Since the lamp unit 7A is tilted substantially in the up-down direction around the second connection section 20A as a fulcrum during the up-down aiming adjustment, the shaft section 17a of the first connection section 17A is moved along a circular arc locus gently protruding in the front-rear direction, whereby the position of the shaft section 17a in the height direction is changed (see FIG. 9). At this time, the pressing member 60 is biased by the biasing spring 61 in a direction in which the sliding slope face 60a of the pressing member 60 is pressed against the supporting slope face 59c of the holding member 59. Hence, the sliding slope face 60a makes slide contact with the supporting slope face 59c and moves in the front-rear direction as the position of the shaft section 17a is changed in the height direction.

Since the pressing member 60 is moved in the front-rear direction as the position of the shaft section 17a in the height direction is changed, the pressing face 60b of the pressing member 60 makes contact with the upper end of the shaft section 17a at all times. As a result, a state is maintained in which the shaft section 17a is pressed downward by the pressing member 60.

Since the pressing member 60 for pressing the shaft section 17a downward is provided in the vehicle headlamp 1A as described above, the arrangement state of the lamp unit 7A in the lamp chamber 5 is stabilized regardless of the change in the position of the shaft section 17a in the height direction during the up-down aiming adjustment. Consequently, the vibration resistance of the vehicle headlamp can be improved.

Furthermore, since the biasing spring 61 for biasing the pressing member 60 is provided, when the position of the shaft section 17a in the height direction is changed, the movement of the pressing member 60 in the front-rear direction in response to the change in the position of the shaft section 17a in the height direction can be securely carried out.

Moreover, when the actuator 53 is moved in the front-rear direction with respect to the rotor 29A in the vehicle headlamp 1A, the second washer 58 and the first washer 56 are moved integrally in the front-rear direction as the actuator 53 is moved. When the actuator 53 is moved in the front-rear direction, the lamp unit 7A is tilted substantially in the up-down direction around the first connection section 17A as a fulcrum. As a result, the so-called leveling adjustment in which the direction of the optical axis that is changed depending on the weight of a load on a vehicle is adjusted is carried out.

At this time, the circular arc face 56b of the first washer 56 makes slide contact with the circular arc face 50a of the spacer 44, and the first washer 56 is moved along a circular arc locus around the first connection section 17A as a fulcrum. Hence, the position of the shaft section 17a of the first connection section 17A in the height direction is not changed during the leveling adjustment, and stable tilting operation of the lamp unit 7A is securely obtained.

Furthermore, at this time, the spherical face 56a of the first washer 56 makes slide contact with the spherical face 58a of the second washer 58. Hence, more stable tilting operation of the lamp unit 17A is securely obtained during the leveling adjustment.

Still further, in the vehicle headlamp 1A described above, when the connecting shaft 55 of the actuator 53 is rotated, the lamp unit 7A is turned in the horizontal direction around the axis connecting the first connection section 17A and the second connection section 20A, as the connecting shaft 55 is rotated. Since the lamp unit 7A is turned, the so-called swivel operation for changing the direction of the optical axis is carried out so as to follow the traveling direction of a vehicle.

In the vehicle headlamp 1A, right-left aiming adjustment can also be carried out by rotating the connecting shaft 55.

Third Exemplary Embodiment

A vehicle headlamp 1B according to a third exemplary embodiment will be described below (see FIGS. 10 and 11).

The vehicle headlamp 1B described below differs from the above-mentioned vehicle headlamp 1 in that leveling adjustment in which the direction of the optical axis is changed depending on the weight of a load on a vehicle can be carried out in addition to aiming adjustment. Hence, only the components of the vehicle headlamp 1B different from those of the vehicle headlamp 1 will be described below in detail, and the components similar to those described above are not described or are only described briefly as necessary, while the same reference codes assigned to the components of the vehicle headlamp 1 are assigned to the components of the vehicle headlamp 1B that are similar to those of the vehicle headlamp 1. Furthermore, since the vehicle headlamp 1B is provided with load holding sections having a configuration similar to that of the load holding sections 43 and 43 of the vehicle headlamp 1A, the same reference codes assigned to the load holding sections of the vehicle headlamp 1A are assigned to the load holding sections of the vehicle headlamp 1B that are similar to those of the vehicle headlamp 1A.

Figure 10:
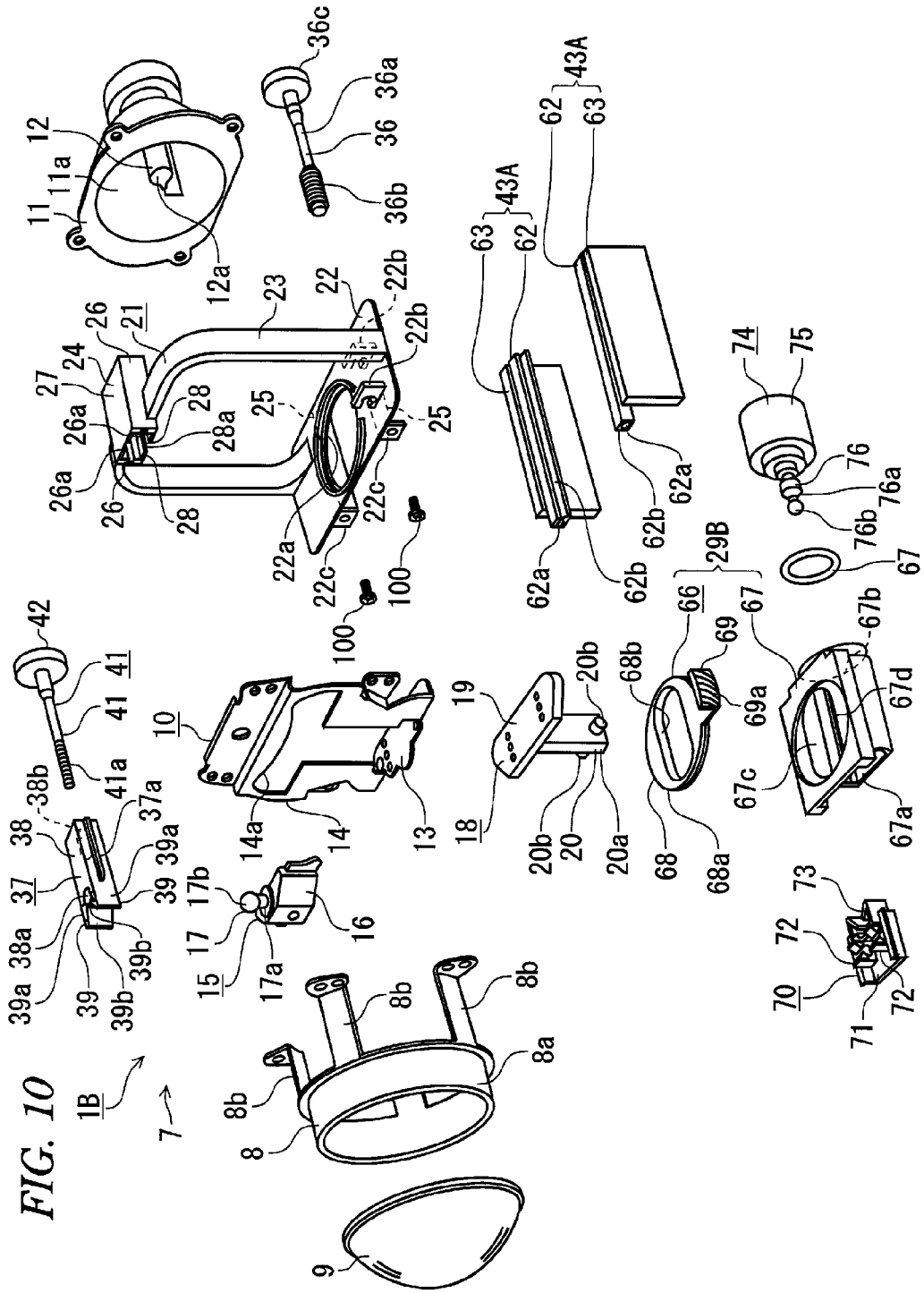
FIG. 10 is an exploded perspective view showing an inner configuration of a vehicle headlamp according to a third exemplary embodiment.
Figure 11:
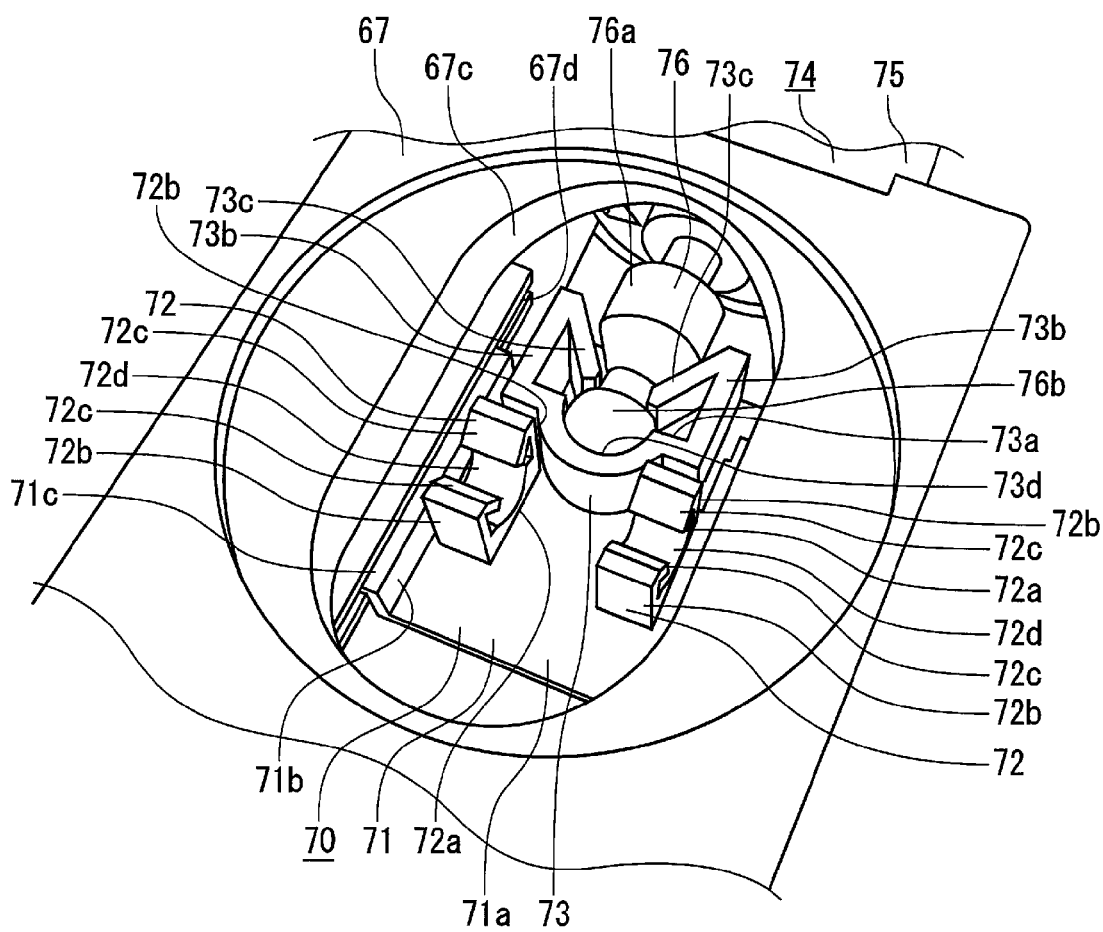
FIG. 11 is an enlarged sectional view showing parts of a rotor, a sliding member and an actuator, in the vehicle headlamp according to the third exemplary embodiment.

The vehicle headlamp 1B has a lamp unit 7 (see FIG. 10). A rotor 29B is turnably supported on the plate section 22 of a frame 21. The rotor 29B is configured by connecting a spacer 66 and a rotor base 67 to each other in the up-down direction with the plate section 22 held therebetween.

The spacer 66 is integrally formed of a rotation base section 68 having a circular outer shape and a working protrusion section 69 protruding sideways from the upper end section of the rotation base section 68.

A flange section 68a extending outward is provided at the upper end section of the rotation base section 68. A protrusion insertion hole 68b, which is long in the front-rear direction is formed in the rotation base section 68.

The end face of the working protrusion section 69 is formed into a circular arc shape gently protruding outward, and a gear section 69a is formed on this end face.

The rotor base 67 is formed into a box shape being open forward and rearward. The forward opening section thereof is provided as a member insertion section 67a, and the rearward opening section thereof is provided as a shaft insertion section 67b. A protrusion section insertion hole 67c, which is long in the front-rear direction, is formed on the upper face section of the rotor base 67, and the shape and the size of the protrusion section insertion hole 67c are the same as those of the protrusion section insertion hole 68b formed in the rotation base section 68.

Guide grooves 67d and 67d, which extend in the front-rear direction and which are separated from each other in the right-left direction, are provided inside the rotor base 67.

The rotation base section 68 of the spacer 66, excluding the flange section 68a thereof, is inserted into the insertion hole 22a formed in the plate section 22 of the frame 21 from above and supported so as to be turnable with respect to the plate section 22. The spacer 66 is secured with an adhesive or the like to the upper face of the rotor base 67 positioned below the plate section 22.

A sliding member 70 is supported inside the rotor base 67 so as to be movable in the front-rear direction. As shown in FIG. 11, the sliding member 70 is integrally formed of a movement base 71, shaft support sections 72 and 72, which protrude upward from the movement base 71, and a shaft holding section 73 provided at the rear end section of the movement base 71.

The movement base 71 is formed of a bottom plate section 71a, side plate sections 71b and 71b protruding upward from both the left and right end sections of the bottom plate section 71a, respectively, and guided sections 71c and 71c protruding outward from the upper end sections of the side plate sections 71b and 71b, respectively.

The shaft support sections 72 and 72 protrude upward from the bottom plate section 71a and are separated from each other in the right-left direction. The shaft support section 72 is formed of a base section 72a protruding upward from the bottom plate section 71a, protrusion sections 72b and 72b protruding upward from both the front and rear end portions 10' of the base section 72a, respectively, and holding protrusion sections 72c and 72c folded back from the upper ends of the protrusion sections 72b and 72b, respectively, and inclined in to become closer to each other as they extend downward. A shaft support face 72d having a circular arc shape and extending in the right-left direction is formed on the upper face of the base section 72a. The protrusion sections 72b and 72b and the holding protrusion sections 72c and 72c of the shaft support section 72 are elastically deformable.

The shaft holding section 73 is formed of a base section 73a protruding upward from the bottom plate section 71a and oriented in the front-rear direction; protrusion sections 73b and 73b protruding rearward from both the left and right end sections of the base section 73a, respectively; and holding protrusion sections 73c and 73c folded back from the rear ends of the protrusion sections 73b and 73b, respectively, and inclined to become closer to each other as they extend forward. A shaft support face 73d having a circular arc shape is formed on the rear face of the base section 73a.

The guided sections 71c and 71c are slidably engaged with the guide grooves 67d and 67d, respectively, whereby the sliding member 70 is movable in the front-rear direction inside the rotor base 67.

In a state in which the sliding member 70 is supported on the rotor base 67, an actuator 74 is connected to the shaft holding section 73 of the sliding member 70 and held thereon.

The actuator 74 has a drive section 75 and a connecting shaft 76 that is moved in the front-rear direction by the drive section 75.

The connecting shaft 76 protrudes forward from the drive section 75 and is formed of a shaft section 76a and a held section 76b having a spherical shape and provided at the end of the shaft section 76a.

The connection shaft 76 is inserted into the shaft insertion section 67b of the rotor base 67 from behind, and the front end section of the drive section 75 is connected to the shaft insertion section 67b via an O-ring 77, whereby the actuator 74 is secured to the rotor base 67. The held section 76b of the connection shaft 76 of the actuator 74 is held with the shaft support face 73d and the holding protrusion sections 73c and 73c of the base section 73a.

On the inner face of the lower face section of the lamp housing 2, load holding sections 43A and 43A, which are separated from each other in the right-left direction are, for example, provided so as to be integrated with the lamp housing 2.

In the lamp unit 7, a second connection section 20 is connected to the sliding member 70. The second connection section 20 is inserted into the protrusion insertion hole 68b of the spacer 66 and the protrusion section insertion hole 67c of the rotor base 67 from above in this order, and the connection shaft sections 20b and 20b of the second connection section 20 are inserted between the holding protrusion sections 72c and 72c on one side of the sliding member 70 and between the holding protrusion sections 72c and 72c on the other side thereof from above, respectively, thereby being connected to the shaft support sections 72 and 72 of the sliding member 70 and supported thereon. At this time, as the connection shaft sections 20b and 20b are inserted, the protrusion sections 72b and 72b on one side of the sliding member 70 are elastically deformed in directions of away from each other and then elastically returned, the protrusion sections 72b and 72b on the other side thereof are elastically deformed in directions away from each other and then elastically returned, the holding protrusion sections 72c and 72c on one side thereof are elastically deformed in directions away from each other and then elastically returned, and the holding protrusion sections 72c and 72c on the other side thereof are elastically deformed in directions away from each other and then elastically returned. As a result, the connection shaft sections 20b and 20b are rotatably supported on the shaft support faces 72d and 72d and on the holding protrusion sections 72c and 72c on the one side and the holding protrusion sections 72c and 72c on the other side, respectively.

In a state in which the second connection section 20 is connected to the shaft support sections 72 and 72 of the sliding member 70, the connection shaft 76 of the actuator 74 is moved in the front-rear direction, and the sliding member 70 is moved in the front-rear direction, whereby the lamp unit 7 is tiltable substantially in an up-down direction around the spherical section 17b of the first connection section 17 of the vehicle headlamp 1B as a fulcrum.

In the above-mentioned vehicle headlamp 1B, when the operation section 36c of the rotation operation section 36 is operated and the worm gear 36b thereof is rotated, the gear section 69a is fed in the direction corresponding to the rotation direction of the worm gear 36b, and the rotor 29B, the actuator 74 and the sliding member 70 are integrally turned with respect to the plate section 22 of the frame 21. When the rotor 29B is turned, the lamp unit 7 is turned in the horizontal direction around the axis connecting the first connection section 17 and the second connection section 20, as the rotor 29B is turned. Since the lamp unit 7 is turned, right-left aiming adjustment is carried out. At this time, the spherical section 17b of the first connection section 17 is rotated with respect to the slider 37 of the vehicle headlamp 1B.

On the other hand, when the operation section 42 of the drive operation section 40 of the vehicle headlamp 1B is operated and the threaded shaft section 41a thereof is rotated, up-down aiming adjustment is carried out.

During the up-down aiming adjustment, the lamp unit 7 is tilted substantially in the up-down direction around the second connection section 20 as a fulcrum.

Moreover, in the vehicle headlamp 1B described above, when the connection shaft 76 of the actuator 74 is moved in the front-rear direction, the sliding member 70 is moved in the front-rear direction with respect to the rotor 29B. When the sliding member 70 is moved in the front-rear direction, the lamp unit 7 is tilted substantially in the up-down direction around the spherical section 17b of the first connection section 17 as a fulcrum. As a result, the so-called leveling adjustment in which the direction of the optical axis that is changed depending on the weight of a load on a vehicle is carried out.

As described above, in the vehicle headlamps 1, 1A and 1B, the connection points of the lamp unit 7, 7A to be connected to the other members thereof are two points, that is, the first connection section 17, 17A and the second connection section 20, 20A positioned substantially in the up-down direction. During optical axis adjustment (during aiming adjustment), the lamp unit 7, 7A is turned in the horizontal direction around the axis connecting the first connection section 17, 17A and the second connection section 20, 20A and tilted substantially in the up-down direction around the second connection section 20, 20A.

Consequently, the vehicle headlamp is hardly affected by the vibration occurring during the traveling of a vehicle, and the vibration resistance of the vehicle headlamp can be improved.

Moreover, since the gravity center G of the lamp unit 7, 7A is positioned between the first connection section 17, 17A and the second connection section 20, 20A, the first connection section 17, 17A and the second connection section 20, 20A serving as the connection points connected to the other members are positioned inside a vertical plane including the gravity center G. Consequently, the vibration resistance of the vehicle headlamp can be further improved.

In accordance with one or more embodiments of the invention, a vehicle headlamp is provided with: a frame secured to a lamp housing; a lamp unit, which includes a first connection section and a second connection section and which is rotatable with respect to the frame; a slider, connected to the first connection section and which is supported on the frame so as to be movable in a front-rear direction, wherein the lamp unit is configured to tilt substantially in an up-down direction around the second connection section in response to a movement of the slider in the front-rear direction; a rotor connected to the second connection section and which is supported on the frame so as to be turnable in a horizontal direction, wherein the lamp unit is configured to turn in the horizontal direction around an axis connecting the first connection section and the second connection section in response to a turning movement of the rotor in the horizontal direction; a drive operation section rotatable with respect to the lamp housing, wherein the slider is configured to move in the front-rear direction in response to a rotating movement of the drive operation section; and a rotation operation section rotatable with respect to the lamp housing. The rotor is configured to turn in the horizontal direction in response to a rotating movement of the rotation operation section. The first connection section and the second connection section are positioned so as to be separated from each other substantially in the up-down direction. According to this structure, the connection points of the lamp unit to the other members thereof are two points, that is, the first connection section and the second connection section positioned substantially in the up-down direction. Furthermore, the lamp unit is turned in the horizontal direction around the axis connecting the first connection section and the second connection section and tilted substantially in an up-down direction around the second connection section. Consequently, the lamp unit is hardly affected by the vibration occurring during the traveling of a vehicle, and the vibration resistance of the vehicle headlamp can be improved.

In the vehicle headlamp, a gravity center of the lamp unit may be positioned in a vicinity of the axis connecting the first connection section and the second connection section. According to this structure, the first connection section and the second connection section serving as the connection points to another member are positioned inside a vertical plane including the gravity center of the lamp unit, and the vibration resistance of the vehicle headlamp can be improved further.

The vehicle headlamp may further be provided with: a load holding section provided in the lamp housing and configured to hold the load of the frame and the lamp unit. According to this structure, the arrangement state of the frame and the lamp unit in the lamp chamber is stabilized. Consequently, the frame and the lamp unit are hardly affected by the vibration occurring during the traveling of a vehicle, and the vibration resistance of the vehicle headlamp can be improved.

The vehicle headlamp may further be provided with: a pressing member movable in the front-rear direction in response to a displacement of the first connection section in a state in which the first connection section is pressed toward the second connection section when the lamp unit is tilted substantially in the up-down direction around the second connection section. According to this structure, the arrangement state of the lamp unit in the lamp chamber is stabilized regardless of the change in the position of the first connection section in the height direction when the lamp unit is tilted substantially in the up-down direction. Consequently, the vibration resistance of the vehicle headlamp can be improved.

The vehicle headlamp may further be provided with: a holding member secured to the slider and including a supporting slope face inclined in a predetermined direction with respect to a horizontal plane; a sliding slope face formed on the pressing member and configured to be in sliding contact with the supporting slope face when the pressing member moves in the front-rear direction; and a biasing member configured to bias the pressing member in a direction in which the sliding slope face is pressed against the supporting slope face. According to this structure, when the position of the first connection section is changed in the height direction, the movement of the pressing member in the front-rear direction in response to the change in the position of the first connection section in the height direction can be carried out securely.

While description has been made in connection with specific exemplary embodiments and modified examples thereof, it will be obvious to those skilled in the art that various changes and modifications may be made therein without departing from the present invention. Therefore, to the appended claims are aimed to cover all such changes and modifications falling within the true spirit and scope of the present invention.

DESCRIPTION OF REFERENCE NUMERALS AND SIGNS

1 ... vehicle headlamp, 2 ... lamp housing, 5 ... lamp chamber, 7 ... lamp unit, 17 ... first connection section, 20 ... second connection section, 21 ... frame, 29 ... rotor, 36 ... rotation operation section, 37 ... slider, 40 ... drive operation section, 43 ... load holding section, 1A ... vehicle headlamp, 7A ... lamp unit, 17A ... first connection section, 20A ... second connection section, 21A ... frame, 29A ... rotor, 37A ... slider, 59 ... holding member, 59c ... supporting slope face, 60 ... pressing member, 60a sliding slope face, 61 ... biasing spring, 43A ... load holding section, 1B ... vehicle headlamp, 29B ... rotor

What is claimed is:

1. A vehicle headlamp comprising:
a frame secured to a lamp housing;
a lamp unit, which includes a first connection section and a second connection section and which is rotatable with respect to the frame;
a slider, connected to the first connection section and which is supported on the frame so as to be movable in a front-rear direction, wherein the lamp unit is configured to tilt substantially in an up-down direction around the second connection section in response to a movement of the slider in the front-rear direction;
a rotor connected to the second connection section and which is supported on the frame so as to be turnable in a horizontal direction, wherein the lamp unit is configured to turn in the horizontal direction around an axis connecting the first connection section and the second connection section in response to a turning movement of the rotor in the horizontal direction;
a drive operation section rotatable with respect to the lamp housing, wherein the slider is configured to move in the front-rear direction in response to a rotating movement of the drive operation section; and
a rotation operation section rotatable with respect to the lamp housing, wherein the rotor is configured to turn in the horizontal direction in response to a rotating movement of the rotation operation section,
wherein the first connection section and the second connection section are positioned so as to be separated from each other substantially in the up-down direction, and
wherein the rotation operation section is inserted into a shaft insertion hole formed in the lamp housing.

2. The vehicle headlamp according to claim 1, wherein a gravity center of the lamp unit is positioned in a vicinity of the axis connecting the first connection section and the second connection section.

3. The vehicle headlamp according to claim 1, further comprising:
a load holding section provided in the lamp housing and configured to hold a load of the frame and the lamp unit.

4. The vehicle headlamp according to claim 1, further comprising:
a pressing member movable in the front-rear direction in response to a displacement of the first connection section in a state in which the first connection section is pressed toward the second connection section when the lamp unit is tilted substantially in the up-down direction around the second connection section.

5. The vehicle headlamp according to claim 4, further comprising:
a holding member secured to the slider and including a supporting slope face inclined in a predetermined direction with respect to a horizontal plane;
a sliding slope face formed on the pressing member and configured to be in sliding contact with the supporting slope face when the pressing member moves in the front-rear direction; and
a biasing member configured to bias the pressing member in a direction in which the sliding slope face is pressed against the supporting slope face.

6. The vehicle headlamp according to claim 1, wherein the slider has a threaded hole extending in the front-rear direction.

7. The vehicle headlamp according to claim 6, wherein the driver operation section is threadedly inserted into the treaded hole of the slider.

8. The vehicle headlamp according to claim 1, wherein the drive operation section engages with the slider.

9. The vehicle headlamp according to claim 1, wherein the drive operation section threadedly engages with the slider.

* * * * *